United States Patent
Drake et al.

(10) Patent No.: US 11,308,945 B1
(45) Date of Patent: Apr. 19, 2022

(54) DATA-PRESERVING TEXT REDACTION FOR TEXT UTTERANCE DATA

(71) Applicant: Amazon Technologies, Inc., Seattle, WA (US)

(72) Inventors: Thomas Drake, Seattle, WA (US); Oluwaseyi Feyisetan, Seattle, WA (US); Thomas Diethe, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 16/560,839

(22) Filed: Sep. 4, 2019

(51) Int. Cl.
*G10L 15/197* (2013.01)
*G10L 15/30* (2013.01)
*G10L 15/22* (2006.01)

(52) U.S. Cl.
CPC .......... *G10L 15/197* (2013.01); *G10L 15/22* (2013.01); *G10L 15/30* (2013.01)

(58) Field of Classification Search
USPC ............. 704/231, 235, 246, 247, 251, 252
See application file for complete search history.

(56) References Cited

U.S. PATENT DOCUMENTS

| | | | |
|---|---|---|---|
| 10,002,639 B1 * | 6/2018 | Gaeta | G10L 15/02 |
| 10,728,384 B1 * | 7/2020 | Channakeshava | G10L 15/05 |
| 2010/0063814 A1 * | 3/2010 | Izuha | G10L 15/22 |
| | | | 704/235 |
| 2017/0011233 A1 * | 1/2017 | Xue | G06F 40/30 |
| 2017/0013127 A1 * | 1/2017 | Xue | G06F 40/279 |
| 2017/0076713 A1 * | 3/2017 | Gildein, II | H04N 7/15 |
| 2019/0245971 A1 * | 8/2019 | Dwyer | G10L 15/26 |
| 2019/0245972 A1 * | 8/2019 | Dwyer | G06F 21/6254 |
| 2019/0245973 A1 * | 8/2019 | Dwyer | G10L 25/72 |

OTHER PUBLICATIONS

Nickel et al. Poincare Embeddings for Learning Hierarchical Representations, May 26, 2017.*
Nagano et al. A Differentiable Gaussian-like Distribution on Hyperbolic Space for Gradient-Based Learning, Feb. 8, 2019.*
Feyisetan et al. Leveraging Hierarchical Representations for Preserving Privacy and Utility in text, Oct. 20, 2019.*

* cited by examiner

*Primary Examiner* — Leonard Saint Cyr
(74) *Attorney, Agent, or Firm* — Davis Wright Tremaine LLP

(57) ABSTRACT

A hypernym of a word in utterance data may be probabilistically determined. The utterance data may correspond to a spoken query or command. A redacted utterance may be derived by replacing the word with the hypernym. The hypernym may be determined by applying noise to a position in a hierarchical embedding that corresponds to the word. The word may be identified as being potentially sensitive. The hierarchical embedding may be a Hyperbolic embedding that may indicate hierarchical relationships between individual words of a corpus of words, such as "red" is a "color" or "Austin" is in "Texas." Noise may be applied by obtaining a first value in Euclidean space based on a second value in Hyperbolic space, and obtaining a third value in Hyperbolic space based on the first value in Euclidean space. The second value in Hyperbolic space may correspond to the word.

19 Claims, 10 Drawing Sheets

DATA-PRESERVING TEXT REDACTION FOR TEXT UTTERANCE DATA

BACKGROUND

Organizations expend significant resources protecting data, such as data entrusted to the organizations by customers and their own operational data. Two common causes of privacy breaches are unintended disclosure and accidental publication of private data. Explicit personally identifiable information (PII) (e.g., an individual's social security number) can potentially be filtered out via rules and pattern matching. Common data privacy solutions such as reg3ex pattern matching, ad-hoc filters, and anonymization strategies are non-private because such approaches do not fully account for side knowledge that an attacker may use in conjunction with a released dataset to identify a specific individual. More subtle privacy attacks occur when seemingly innocuous information, e.g., favorite electronics, clothing, foods, is used to discern the private details of an individual. It can be difficult to identify which subsets of seemingly innocuous data stored in a system may lead to a privacy breach when combined with additional information obtained outside of the system. As a result, privacy preserving analysis has been studied in statistics, machine learning and data mining to build systems that provide better privacy guarantees.

BRIEF DESCRIPTION OF THE DRAWINGS

Various techniques will be described with reference to the drawings, in which.

DETAILED DESCRIPTION

Figure 1:
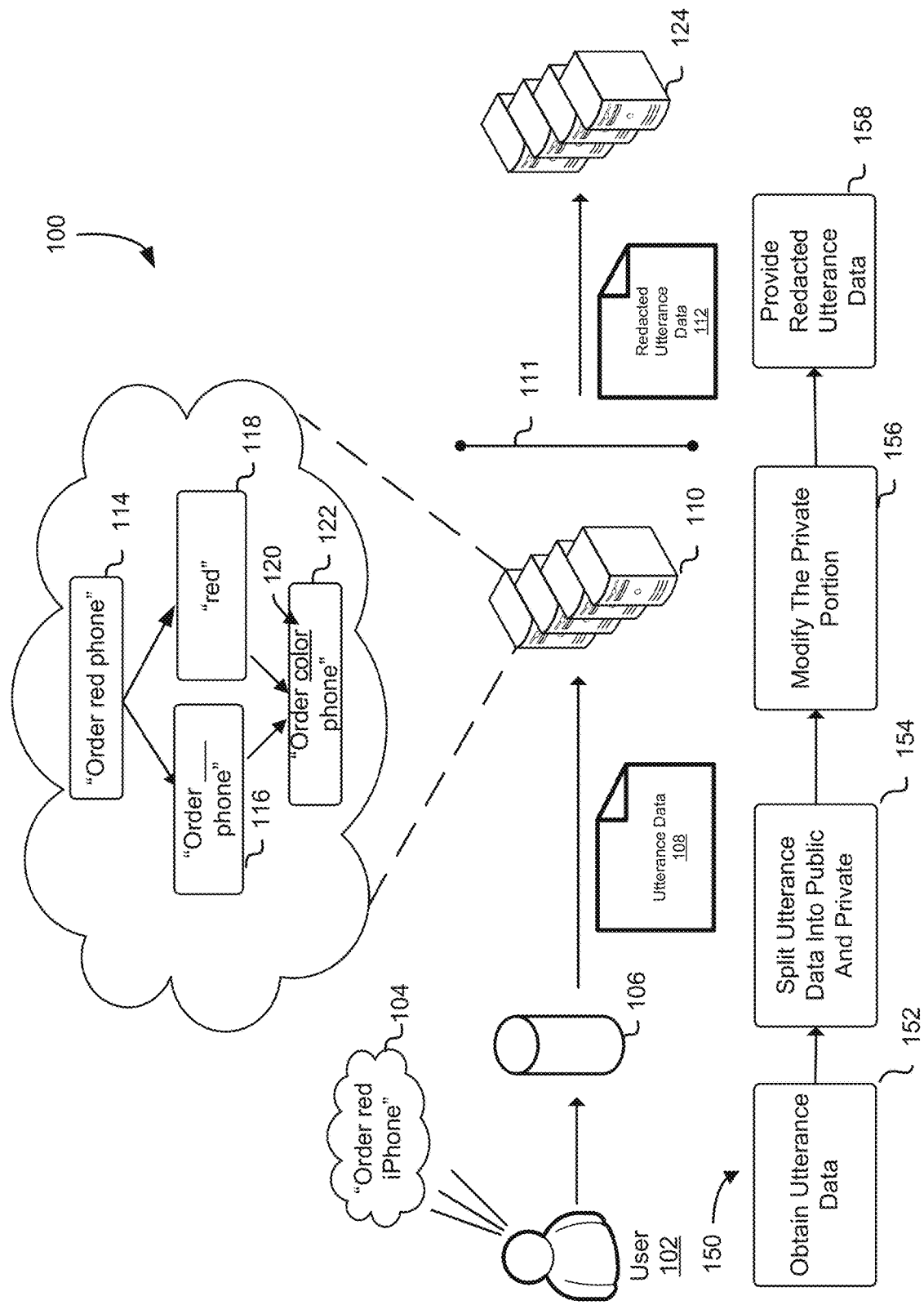
FIG. 1 shows an illustrative example of an environment of a text redaction scheme for text derived from utterance data in accordance with one or more example embodiments of the present disclosure.

Differential privacy systems and methods are disclosed herein and involve using a hierarchical word embedding to determine a hypernym for a word in order to provide privacy and intent-preserving redactions. A user device (e.g., a smart home device) may receive an utterance from one or more users. An utterance may be encoded in an audio signal and may include, for example, a question, a statement, a search query, a voice command, a dialog or conversation, or any other spoken expression, e.g., "Order red phone." Utterance data, such as a transcript of words corresponding to the utterance, may be derived from the audio signal.

Words of the utterance may be classified as potentially sensitive, for example, using differentially private explorations trees or n-grams. Strings with frequency counts above a threshold may be classified as having a low likelihood of being sensitive or not being sensitive. For example, commonly used words such as "the," "or," or "order" may be given a classification that is indicative of not being not being sensitive. Other words of the utterance may be given a classification of being potentially sensitive. The classifications may be binary. For example, words of the utterance data with a potentially sensitive classification may be identified as the remaining words in the utterance data that are not classified as sensitive. In some implementations, a sensitivity score may be determined for a word in an utterance. For example, a social security number may be given a relatively high sensitivity score, the term "Austin" may be given a medium sensitivity score, and the term "the" may be given a relatively low sensitivity score. In such implementations, a threshold score may be determined and words below the threshold may be categorized as not being sensitive and words above the threshold may be categorized as potentially sensitive. A replacement word for a potentially sensitive word may be obtained using a hierarchical representation of a corpus of words. The hierarchical representation may include a Hyperbolic representation or embedding. A hypernym of a word of the potentially sensitive portion may be determined by perturbing a hierarchical representation. "Hypernym" refers to a word with a broad meaning that more specific words fall under. The generic term "social security number" is a hypernym of an actual social security number, such as "12-34-5678" and "Texas" is a hypernym of "Austin" and "Dallas." A hierarchical representation of a corpus of words may indicate hierarchical relationships (IS-A) between individual words, such as "Houston" is in "Texas," a "square" is a "shape," "red" is a "color," "Seattle" is in "King County," and "King County" is in "Washington." A redacted utterance may be derived where a portion of the utterance data with a potentially sensitive classification has been replaced with a hypernym. The hypernym may be determined by adding noise to a hyperbolic embedding of a corpus of words. The noise may be determined by obtaining a first value in Euclidean space based on a second value in Hyperbolic space, and obtaining a third value in Hyperbolic space based on the first value in Euclidean space. The second value in Hyperbolic space may correspond to a word of a portion that has been categorized as potentially sensitive. The utterance data may be a search request or a comment. As a result of the redacted utterance being determined, a search query may be performed. Hyperbolic embeddings may be represented as Lorentz or Poincaré models and may indicate hierarchical relationships between individual words of a corpus of words.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

When differentially private techniques or mechanisms inject noise into dataset such that it destroys a user's contribution to that dataset, and therefore hides them, privacy may be preserved. However, there can be negative consequences to the data because the noise may change the meaning of the data. This disclosure provides systems and methods that helps preserve privacy and utility of the text. The systems and methods described herein involve a text redaction algorithm that is differentially private and can scramble text in such a way that protects privacy and attempts to preserve the meaning of the text. This disclosure provides an algorithm that preserves both privacy and attempts to preserve the utility and text.

As one skilled in the art will appreciate in light of this disclosure, certain embodiments may be capable of achieving certain advantages, including some or all of the following: allows for words to be replaced with other words in order to provide privacy protection for a user without significantly changing a user's intent, makes data less susceptible to being breached by attacks attempting to utilize patterns in user data, provides stronger privacy preservation than existing differential privacy methods, and compared to existing differential privacy algorithms provides data that is more useful, for example, in machine learning applications.

Referring now to FIG. 1, an illustrative example of an environment 100 is depicted for providing redactions for text derived from utterance data in accordance with one or more example embodiments of the disclosure. As illustrated in FIG. 1, a user 102 may speak one or more utterances 104. Utterance 104 may include, for example, one or more words, such as a statement, a question, one or more words, a conversation, or one or more verbal commands. As used herein the term "word" may refer to textual elements with known meaning, textual elements that provide information such as birthdays, social security numbers, abbreviations, addresses, phone numbers, and the like, and textual elements corresponding to sounds (e.g., "uh," "ah," laughter, cough, crash, etc.). User 102 may be a human user. Utterance 104 may be in various languages. Utterance 104 may include personally identifiable information or information that is capable of exploitation by attackers to obtain personally identifiable information about the user.

Utterance 104 may be received by an utterance detection device 106, which may include a hardware device (e.g., a physical, standalone computer system such as a desktop computer, laptop computer, tablet device, mobile device, embedded device, etc.), a software-based system (e.g., a virtual machine instance), or some combination thereof, including, but not limited to, further examples listed below. Utterance detection device 106 may include, a server computer system (such as described below) or a distributed computer system comprising multiple computer systems, each with one or more processors and memory that stores instructions executable by the one or more processors to perform at least some of the operations described herein. In one or more implementations, utterance detection device 106 may include a microphone for detecting utterances or encoding utterances into an audio signal. Utterance detection device 106 may include any suitable processor-driven device including, but not limited to, a mobile device or a non-mobile, e.g., a static, device. For example, the utterance detection device 106 may include a smart home device, a digital set-top box, a user equipment (UE), a station (STA), an access point (AP), a software enabled AP (SoftAP), a personal computer (PC), a wearable device (e.g., watch, glasses, hat, coat, jewelry, etc.), a desktop computer, a mobile computer, a laptop computer, a notebook computer, a tablet computer, a handheld device, an internet of things (IoT) device, an appliance (e.g., a microwave), an on-board device, an off-board device, a hybrid device (e.g., combination of cell phone with a tablet, a consumer device, a vehicle device, a non-vehicular device, a personal digital assistant (PDA) device, a GPS device, a mobile internet device, a context-aware device, a video device, an audio device, an AN device, a set-top-box (STB), a blu-ray disc (BD) player, a BD player, a digital video disc (DVD) player device, a DVD recorder, a personal video recorder (PVR), a broadcast receiver, a video source, an audio source, an audio sink, a broadcast radio receiver, a stereo tuner, a gaming device, a smart speaker, a virtual reality device, a virtual assistant, a digital camera, a media player, a smartphone, a television, a flat-panel display, or the like.

In one or more implementations, the utterance detection device 106 may generate utterance data 108 based on a received utterance. For example, utterance detection device 106 may generate an audio signal encoding utterance 104. Utterance data 108 may include an audio signal that encodes utterance 104. In one or more implementations, the utterance data 108 may include a text-based transcription of utterance 104. For example, the utterance detection device 106 may encode an utterance from user 102 into an audio signal, which may be sent to a remote service that converts the audio signal to a text-based transcription of utterance 104. In another example, utterance detection device 106 may process utterance 104 into text-based transcript of the utterance 104.

The utterance detection device 106 may provide (e.g. send, transmit) utterance data 108 to redaction service 110. The redaction service 110 may include any suitable computing device capable of sending and receiving data and performing the processing disclosed herein. For example, redaction service 110 may include, a server computer system (such as described below) or a distributed computer system comprising multiple computer systems, each with one or more processors and memory that stores instructions executable by the one or more processors to perform at least some of the operations described herein. In one or more implementations, the redaction service 110 may communicate utterance data 108 from one or more communication networks. In one or more implementations, the redaction service may receive the utterance data 108 from the utterance detection device 106 as a result of the utterance detection device 106 receiving the utterance 104.

In some implementations, the redaction service 110 may process utterance data 108 to generate redacted utterance data 112. As described herein, entities spend substantial resources protecting individual's private data. An inadvertent release of an individual's private data by an entity charged with securing the information may carry a high cost in terms of both the entity's reputation and large capital costs (e.g., fines, litigation, etc.) associated with a data breach. Unfortunately, common data privacy solutions such as regex pattern matching, ad-hoc filters, and anonymization strategies are provably non-private, because these approaches cannot anticipate, and do not account for, potential side knowledge an attacker can use in conjunction with a released dataset. One privacy definition that takes into account the limitations of existing approaches by preventing data reconstruction and protecting against any potential side knowledge is differential privacy.

In some implementations, the redaction service 110 may generate the redacted utterance data 112 using a differential privacy-compliant redaction algorithm featuring one or more word replacements obtained from a representation that indicates hierarchical relationships between words (e.g., a model in Hyperbolic space). As illustrated by the schematic line 111 separating the redaction service 110 and the redacted utterance data 112, processes upstream of schematic line 111 may adhere to particular requirements for privacy and security of the utterance data 108, while processes downstream of the line 111 may apply relatively more relaxed requirements due to the replacement of word and/or phrases with a high probability of being sensitive in a manner that is not capable of being reverse engineered to ascertain the sensitive words or phrases, or the other inferences plausibly made using such information.

In some implementations the redaction service 110 may provide an output that satisfies the formal constraints of metric differential privacy within arbitrarily desired privacy bounds. For example, the redaction service 110 may take a text query x and return a query ($x_p$, $x_s$), which contains the original query with one or more words perturbed. The value $x_p$ may be obtained by leveraging on publicly available information to model an adversary's side knowledge. In this manner, $x_p$ includes no information beyond that which can already be discovered from the public domain. In some implementations, the redaction service 110 constructs $x_s$ by adding noise to words in a space that represents hierarchical relationships between words, such as a Hyperbolic space. Hyperbolic space can be constructed with different isomorphic models such as, but not limited to: the Klein model, the Poincaré disk model, the Poincaré half-plane model, and the Lorentz (or hyperboloid) model.

In some implementations, a distance distributions may be controlled by parameter ε. The word embedding models may be public and constructed from openly available datasets. Consequently, the result of $x_s$, does not reveal private information. The resulting query is one that may confer plausible deniability to the author of input query x. In some implementations, the redaction service 110 may generate redacted utterance data 112 using a metric differential privacy-compliant redaction algorithm. In some embodiments, the redaction service 110 may receive or generate a text transcription 114 based on the utterance 104 according to one or more embodiments. As depicted in FIG. 1, for example, the text transcription 114 may state, "Order red phone."

In one or more implementations, the redaction service 110 may generate redacted utterance data 112 using a differential privacy-compliant redaction algorithm. In some implementations, the redacted utterance data 112 may include new text transcription 122 as well as metadata associated with the new text transcription 122, such as, for example, a timestamp, a date, a user account identification, a user identification, or an utterance type. Replacement 120 redaction service 110 may receive or generate a text transcription 114 based on utterance 104 according to one or more embodiments. For example, as shown in FIG. 1, text transcription 114 may state "Order red phone."

In some embodiments, the redaction service 110 may split the text transcription 114 into a first portion 116 and a second portion 118, for example, based on classifications. The first portion 116 may include, for example, a substring of the text transcription 114 that exists separately in a public domain (e.g., in a public database, in the general lexicography). Conversely, the second portion 118 may include, for example, a substring of the text transcription 114 that does not appear in the public domain. In some implementations, the first portion may be classified as not being sensitive information, and the second portion may be classified as including potentially sensitive information. As used herein, a degree of sensitivity indicates a likelihood that an attacker could use the portion to determine personal information pertaining to the individual who provided the utterance. In some embodiments, the redaction service 110 may search or otherwise access one or more public domains (e.g., a database, a dictionary, a library) for the longest substring in the text transcription 114 that appears in the public domain. In one or more implementations, the longest substring may be defined as the first portion 116, while the remaining substring may be defined as the second portion 118. As depicted in FIG. 1, for example, the first portion 116 may state, "Order phone," while the second portion 118 may state, "red." In this example, "order" and "phone" have been classified as not being sensitive, and "red" has been classified as potentially being sensitive. The term "red" may be usable by an attacker to determine private information about a user.

In some embodiments, the redaction service 110 determines a replacement 120 (redaction) for one or more elements in the second portion 118. In some embodiments, this replacement 120 may be selected from hypernym of the second portion 118. For example, a city such as "Ohio" may be replaced by "state." In another example, music genre such as "techno" may be replaced by "music." In another example, a book title such as "Rules of Civility" may be replaced with "book" or "entertainment." In yet another example, an application "lastfm" may be replaced by "app." In some embodiments, the replacement 120 may be randomly selected from a list of candidates that are hypernyms of the second portion 118. For example, "red" in the phone example may have a list of candidates that includes "color," "style," or "model."

In some implementations, the redaction service 110 determines a new text transcription 122 that combines the first portion 116 of the text transcription 114 with the replacement 120. As depicted in FIG. 1, for example, the new text transcription 122 may state, "Order color phone." In some implementations, redaction service 110 may generate redacted utterance data 112 based on new text transcription 120 receive or generate a text transcription 114 that exists separately in a public domain.

In some implementations, redacted utterance data 112 may be provided to a data service 124 that may utilize or store redacted utterance data. Data service 124 may include, a server computer system (such as described below) or a distributed computer system comprising multiple computer systems, each with one or more processors and memory that stores instructions executable by the one or more processors to perform at least some of the operations described herein. For example, data service 124 may include one or more remote servers, a desktop computer, a laptop computer, a workstation, a cloud-based computing environment, resource, platform, distributed system, or the like. In some implementations, the data service 124 may receive the redacted utterance data 112 from the redaction service 110. In some implementations, the redaction service 110 may send the redacted utterance data 112 as a result of the redaction service 110 generating the new text transcription 122. In some implementations, the redacted utterance data is provided as a search query to data service 124, which is search engine.

In some implementations, data service 124 may store redacted utterance data 112 for subsequent availability. For example, redacted utterance data 112 may be stored at data service 124 or within a local or remote database accessible by data service 124. In one or more implementations, data service 124 may provide the redacted utterance data 112 to one or more downstream processes or systems such as, for example, a search engine or data analytics service. Because the redacted utterance data 112 includes a privacy and intent-preserving redaction of utterance 104, downstream processes or systems may be provided access to redacted utterance data 112 without triggering additional privacy concerns. In other words, redacted utterance data 112 may be cleaned and may be available for low security system s or public facing analytics (e.g., redacted utterance data may be provided with reduced privacy concerns).

Redaction service 110 may perform redactions using a differential privacy-compliant redaction algorithm featuring one or more word replacements. Differential privacy refers to a standard for defining and dealing with privacy and disclosure prevention. A randomized algorithm may be differentially private if its output distribution is similar when the algorithm runs on two adjacent inputs that differ only for a single individual. It is desirable to apply differential privacy to natural language processing and text domain, such as implementations set forth in FIG. 1.

Differential privacy has been established as a mathematically well-founded definition of privacy. Differential privacy may mathematically guarantee that an adversary observing the result of an analysis will make essentially the same inference about any user's information, regardless of whether the user's data is or is not included as an input to the analysis. For a randomized mechanism M: $\mathcal{X} \to \mathcal{Y}$ satisfies ε differential privacy if for any x, x'∈$\mathcal{X}$ the distributions over outputs of M(x) and M(x') satisfy the following bound: for all y∈$\mathcal{Y}$, $$\frac{Pr[M(x) = y]}{Pr[M(x') = y]} \leq e^{\varepsilon d(x, x')}$$

where d(x, x') is the Hamming distance and ε is the measure of privacy loss. Other possible distance metrics may be suitable where the Hamming distance is unable to capture the notion of closeness between datasets.

In some implementations, a privacy model built using a Manhattan distance metric can be used to provide indistinguishability when the objective is to release the number of days from a reference point. Similarly, using a Euclidean distance on a 2d plane can be used to preserve privacy while releasing a user's longitude and latitude to mobile applications. In some implementations, Chebyshev distance can be adopted to perturb the readings of smart meters thereby preserving privacy on what TV channels or movies are being watched.

To apply $d_x$-privacy to the text domain, first, words may be organized in a space equipped with an appropriate distance metric by representing words using a word embedding model. Word embeddings may organize discrete words in a continuous metric space such that their similarity in the embedding space reflects their semantic or functional similarity. Word embedding models like Word2Vec, GloVe, and fastText may create such a mapping $\phi: \mathcal{W} \to \mathbb{R}^n$ of a set of words $\mathcal{W}$ into n-dimensional Euclidean space. The distance between words is measured by the distance function d: $\mathcal{W} \times \mathcal{W} \to \mathbb{R}_+$. This follows as d(w, w')=d(φ)(w), φ(w')=∥φ(w)−φ(w)∥ where ∥·∥ denotes the Euclidean norm on $\mathbb{R}^n$. The vectors $\phi(w_i)$ are generally learned by proposing a conditional probability for observing a word given its context words or by predicting the context giving the original word in a large text corpus.

Euclidean embeddings can model semantic similarity between discrete words in continuous space. However, it may be desirable to model the latent hierarchical structure of words. Learning the vector representation in Hyperbolic space $\phi: \mathcal{W} \to \mathbb{H}^n$ in may represent semantic similarity and hierarchical relationships between words (without exponentially increasing the dimensionality of the embeddings). A Hyperbolic model may be used to indicate word hierarchy through the norms of the word vectors and word similarity through the distance between word vectors. Hyperbolic embedding may be used to indicate IS-A relationships (or concept hierarchies) between words of a large text corpus. For example, Hyperbolic embeddings may indicate hypernymy relationships (e.g., LONDON→ENGLAND) and multiple latent hierarchies for a given word (e.g., LONDON→LOCATION and LONDON→CITY).

In some Euclidean models, the utility may degrade as the privacy guarantees increase because the noise injected increases to match the privacy guarantees, resulting in words that may not be semantically related to the initial word. A space defined by Hyperbolic geometry, in addition to the distribution of words as concept hierarchies may reduce this problem while preserving privacy and utility of the user's query.

Hyperbolic space $\mathbb{H}^n$ may be a homogeneous space with constant negative curvature. Hyperbolic space may exhibit Hyperbolic geometry, characterized by a negation of the parallel postulate with infinite parallel line passing through a point. Hyperbolic space may be distinguished from the other two isotropic spaces: Euclidean $\mathbb{R}^n$, with zero (flat) curvature; and spherical SS', with constant positive curvature. Hyperbolic spaces typically may not be embedded isometrically into Euclidean space, therefore embedding results in every point being a saddle point. In addition, the growth of the Hyperbolic space area is exponential (with respect to the curvature K and radius r), while Euclidean space grows polynomially. TABLE I shows properties of Euclidean and Hyperbolic geometries. The parallel lines property refers the number of lines parallel to a line and that go through a point not on this line, and $\zeta = \sqrt{|K|}$.

TABLE I

| Property | Euclidean | Hyperbolic |
|---|---|---|
| Curvature K | 0 | <0 |
| Parallel lines | 1 | ∞ |
| Triangles are | normal | thin |
| Sum of Δ angles | π | <π |
| Circle length | 2πr | 2π sinh ζr |
| Disk area | 2πr²/2 | 2π (cosh ζr − 1) |

Hyperbolic space can be constructed with different isomorphic models such as but not limited to the Klein model, the Poincaré disk model, the Poincaré half-plane model, and the Lorentz (or hyperboloid) model.

To provide privacy and intent-preserving redactions, an example process flow 150 is presented and may be performed, for example, by the utterance detection device 106, the redaction service 110, and/or the data service 124. In some implementations, the utterance detection device 106, the redaction service 110, and/or the data service 124 may each include at least one memory that stores computer-executable instructions and at least one processor configured to access the at least one memory and execute the computer-executable instructions to perform various actions or operations, such as one or more of the operations in the process flow 150 of FIG. 1.

At a first block 152, a user device (e.g., a smart home device, such as the utterance detection device 106 depicted in FIG. 1) may receive utterance data from one or more users. The utterance data may include, for example, a question, a statement, a search query, a voice command, a dialog or conversation, or any other spoken expression. For example, the utterance data may include the phrase, "Order Red phone," as depicted in FIG. 1. The utterance data may be encoded in an audio signal.

At block 154, the utterance data may be split or otherwise partitioned into a first portion and a second portion according to one or more implementations. In some implementation, the first portion may be identified by searching a differentially private exploration tree of variable length n-grams. The first portion may be classified as not being sensitive, and the second portion may be classified as potentially sensitive. In some implementations, words of utterance data that are apportioned to a first portion may be determined and the remainder the remaining terms of the utterance data may be apportioned to the second portion. In some implementations, potentially sensitive words of the utterance data may be identified and classified as the second portion, and the remaining words may be apportioned into the first portion and classified as not being sensitive. In some implementations, a sensitivity score may be determined for individual words of the utterance. Words with sensitivity scores above a threshold may categorized as the second portion and words with sensitivity scores below a threshold may be categorized as the first portion. In some implementations, utterance data may be apportioned into more than two portions. For example, words in the utterance data may be categorized as sensitive. For example, a social security number, birthdate, full name, or address may be identified and included in a third portion of the utterance data. In such implementations, an identified social security number may be replaced with the generic term "social security number" or a made up number, such as "555-55-5555." Similar replacements can be made with respect to other sensitive data.

In some implementations, the differentially private exploration tree may be created such that every node represents a word and each node may be associated with a query defined by the sequential walk from the root of the tree to that node. In some implementations, the value of each node may be a count of the number of times a query occurs. In some implementations, every node and leaf of the exploration tree may contain the noisy count of the original query that terminates at that node or leaf.

In some implementations, the exploration tree may be searched to select a first portion of the utterance data that is classified as not being sensitive. In some implementations, one or more strings may be matched against the exploration tree and the string having the longest prefix, with the highest frequency count, may be selected as the first portion.

In some implementations, a second portion with a classification of potentially sensitive or sensitive information may be modified, for example by redaction service 110, using a Hyperbolic differentially private mechanism to obtain a replacement that preserves the privacy of the source of the utterance data. In some implementations, the replacement may be selected to ensure that the replacement is a hypernym of the portion it replaced. A hypernym may be probabilistically determined, for example, using systems and methods described herein.

At block 156, the second portion (e.g., that remaining portion which was not included within the first portion) may be modified using a MadLib-style substitution according to one or more embodiments. In some implementations, the utterance detection device 106, the redaction service 110, and/or the data service 124 depicted in FIG. 1 may be configured to generate the resulting redacted utterance data.

In some embodiments, the differentially private mechanism may take as input a stringy containing x words and outputs a string y' of the same length. In some embodiments, the Hyperbolic differentially private redaction mechanism may preserve an underlying interleaving structure. In other words, it is not necessary that a potentially sensitive portion-portion be wholly separated from a portion that does not contain sensitive information. For example, the phrase "Order red phone" may include portion, "Order _____ phone" and a potentially sensitive portion, "red."

At block 158, the redacted utterance data may be transmitted to or received by a data service (e.g., the data service 124 depicted in FIG. 1). In some implementations, the redacted utterance data are locally stored on a memory device a redaction service (e.g., the redaction service 110 depicted in FIG. 1). In some embodiments, the redacted utterance data may be provided to one or more downstream systems or processes for additional processing.

Advantageously, the redacted utterance data has been scrubbed of personally identifiable information with probabilistic privacy guarantees, and may consequently be used by downstream systems and processes that may not satisfy stringent data protection regulations.

Figure 2:
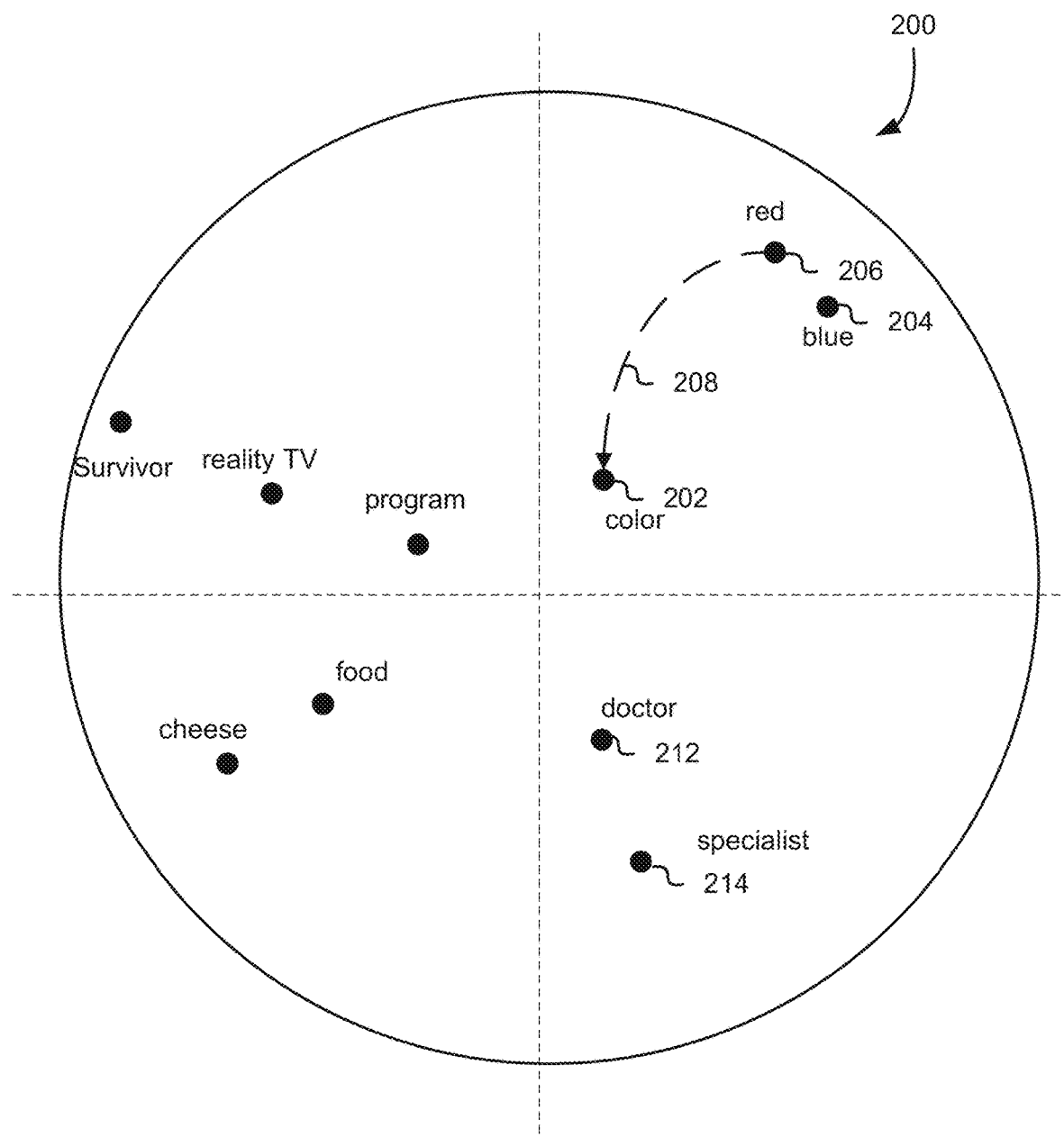
FIG. 2 shows an illustrative example of words embedding into a $\mathcal{B}^2$ Poincaré disk that may be used in accordance with one or more implementations of the present disclosure.

FIG. 2 illustrates an example Hyperbolic embedding of a WebIsADb IS-A relationships into a $\mathcal{B}^2$ Poincaré disk 200. Poincaré disk 200 may include a corpus of words, such as "color" 202, "blue" 204, "red" 206, "doctor" 212, and "specialist" 214. A geometric structure of the Poincaré disk 200 embeddings may represent a metric space over which privacy protection may be provided. As shown in Poincaré ' disk 200, higher order concepts are distributed towards the center of the disk, instances are found closer to the perimeter, and similar words are equidistant from the origin. In some implementations, redaction service 110 may utilize a Hyperbolic embedding, such as Poincaré disk 200 to identify a hypernym of a word that is to be redacted. For example, the word "red" may be perturbed with noise 208 to obtain the word "color" 202. Noise 208 may be obtained, for example, using the process 500 disclosed in FIG. 5. The added noise may be a Laplace noise.

In one or more implementations, Poincaré disk 200 may be trained using data from a database of hypernymy relations (e.g., WEBISADB) extracted from a corpus. In one or more implementations, the dataset used to train the model may be narrowed by selecting relations of words (i.e., an instance and a class) that occur in a vocabulary (e.g., GLOVE). In some implementations, data used to train the Poincaré disk 200 may be restricted to data in links that found at least a threshold amount of times (e.g., 10) in a CommonCrawl corpus. In some implementations, stop words, offensive words, or outliers (words with just 2 links) may be filtered from the dataset. In some implementations, a final dataset of over 100,000 IS-A relationships may be used to train a 100 dimension Poincaré ' embedding model.

In general, an n-dimensional Poincaré ball $\mathcal{B}^n$, such as Hyperbolic embedding 200, may be a model of Hyperbolic space $\mathbb{H}^n$ where all the points are mapped within the n-dimensional open unit ball i.e., $\mathcal{B}^n = \{x \in \mathbb{R}^n | \|x\| < 1\}$ where $\|\cdot\|$ is the Euclidean norm. The boundary of the ball i.e., the hypersphere $\mathbb{S}^{n-1}$ may not be part of the Hyperbolic space, but may represent one or more points that are infinitely far away. The Poincaré ball may be a conformal model of Hyperbolic space (i.e., Euclidean angles between Hyperbolic lines in the model may be equal to their Hyperbolic values) with metric tensor: $g_p(x)=[2/(1-\|x\|^2)]^2 g_e$ where $x \in \mathbb{B}^n$ and $g_e$ is the Euclidean metric tensor. The Poincaré ball model may then correspond to the Riemannian manifold $\mathcal{P}n=(\mathcal{B}^n, g_p)$. Considering that the unit ball indicates the infinite Hyperbolic space, a distance metric may be represented by: $d\rho=2dr/(1-r^2)$ where $\rho$ is the Poincaré distance and r is the Euclidean distance from the origin. Consequently, the growth in distance $d\rho \to \infty$ as $r \to 1$, which proves the infinite extent of the ball. Therefore, given 2 points (e.g. representing word vectors) u, $v \in \mathcal{B}^n$ an isometric invariant may be defined by:

$$\delta(u, v) = 2 \frac{\|u - v\|^2}{(1 - \|u\|^2)(1 - \|v\|^2)}$$

and the distance function over $\mathcal{P}^n$ may be given by:

$$d(u, v) = \text{arcosh}(1 + \delta(u, v))$$

$$= \text{arcosh}\left(1 + 2\frac{\|u - v\|^2}{(1 - \|u\|^2)(1 - \|v\|^2)}\right)$$

In some implementations, other Hyperbolic space models, such as a Lorentz model, may be used. A Lorentz model (also known as the hyperboloid or Minkowski model) may be a model of Hyperbolic space $\mathcal{H}^n$ in which points may be represented by points on a surface of an upper sheet of a two-sheeted hyperboloid in (n+1)-dimensional Minkowski space. A Lorentz model may include a combination of n-dimensional spatial Euclidean coordinates $x_i^k$ for k=1, 2, ..., n; and a time coordinate $x_i^0<0$. Given points u, $v \in \mathbb{R}^{n+1}$, the Lorentzian inner product (Minkowski bilinear form) may:

$$\langle u, v \rangle_\mathcal{L} = -u_0 v_0 + \sum_{i=1}^{n} u_1 v_1$$

As the product of a point with itself is −1 and the norm may be defined as $$\|x\|_\mathcal{L} = \sqrt{\langle x, x \rangle_\mathcal{L}},$$

a Riemanman manifold can be computed: $\mathcal{L}^n=(\mathcal{H}^n, g_l)$ where: $\mathcal{H}^n=\{u \in \mathbb{R}^{n+1} \langle u, v \rangle_\mathcal{L}=-1, u_0>0\}$ and the metric tensor $g_l=\text{diag}(+1, -1, ..., -1)$. Given a vector representation of a word at the origin in Euclidean space $\mathbb{R}^n$ as [0, 0, ... 0], the word's corresponding vector location in the Hyperboloid model $\mathbb{R}^{n+1}$ [1, 0, ..., 0] where the first coordinate $x_0$ for $x=(x_0, x') \in \mathbb{R}^{n+1}$ may be $$x_0 \in \mathcal{H}^n = \sqrt{1 + \|x'\|^2}$$

where $x'=(x_1, ..., x_n)$. The Hyperbolic distance function may admit a simple expression in $\mathcal{L}^n$ and it may be given as: $d_l(u, v)=\text{arcosh}(-\langle u, v \rangle_\mathcal{L})$. This distance function satisfies the axioms of a metric space (i.e. identity of indiscernibles, symmetry and the triangle inequality). Its simplicity and satisfaction of the axioms make it the ideal model for constructing a privacy proof.

Both Lorentz and Poincaré models may describe a similar structure of Hyperbolic space characterized by its constant negative curvature. Both Lorentz and Poincaré models may represent different coordinate charts in the same metric space. Therefore, the Lorentz and Poincaré model may be related by a diffeomorphic transformation that preserves all the properties of the geometric space, including isometry. It can be observed that a point $x\rho$ in the Poincaré model is a projection from the point $x_\mathcal{L}=(x_0, x')$ in the Lorentz model, to the hyperplane $x_o=0$ by intersecting it with a line drawn through −1, 0, ..., 0. Point $x\rho$ can be mapped across manifolds from the Lorentz to the Poincaré model via the transformation $$x\rho : \mathcal{L}^n \to \mathcal{P}^n \text{ where: } x\rho = \frac{x'}{1+x_0} \text{ where } x' = (x_1 ..., x_n).$$

Figure 3:
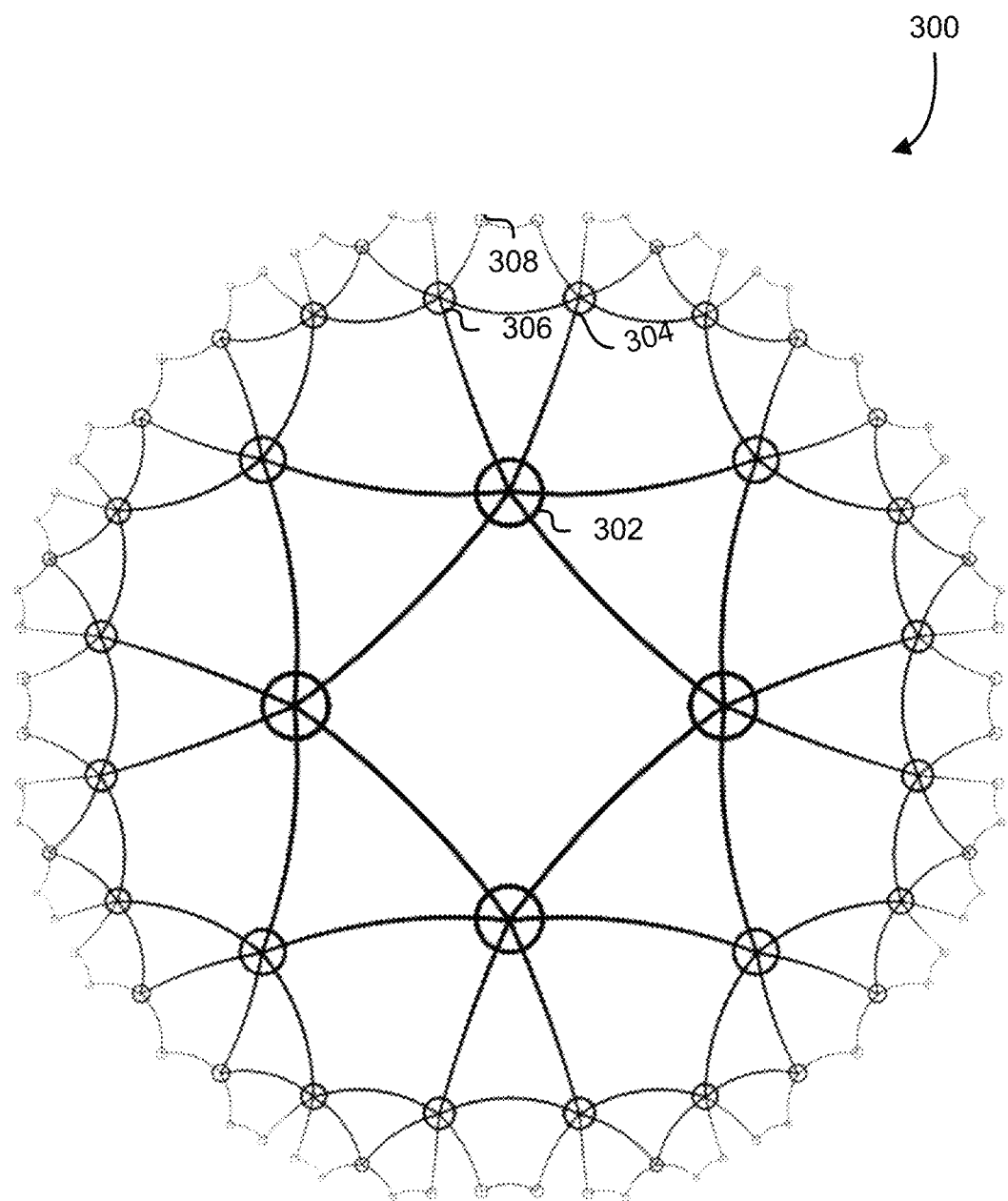
FIG. 3 shows an illustrative example of a square and triangle in in Poincaré ball $\mathcal{B}^2$ that may be used in accordance with one or more implementations of the present disclosure.

FIG. 3 illustrates an example $\mathcal{B}^2$ Poincaré disk 300 with tiling a square and triangle such that line segments have identical Hyperbolic length. Poincaré disk 300 may include words 302, 304, 306, and 308 that are embedded therein. In some implementations, word 302 may be a hypernym of words 304 and 306. Similarly, word 306 may be a hypernym of word 308. In some implementations, words 304 and 306 may be similar instances. In Poincaré disk 300, higher order concepts may be distributed towards the center of the disk, instances may be closer to the perimeter, and similar words may be equidistant from the origin.

Figure 4:
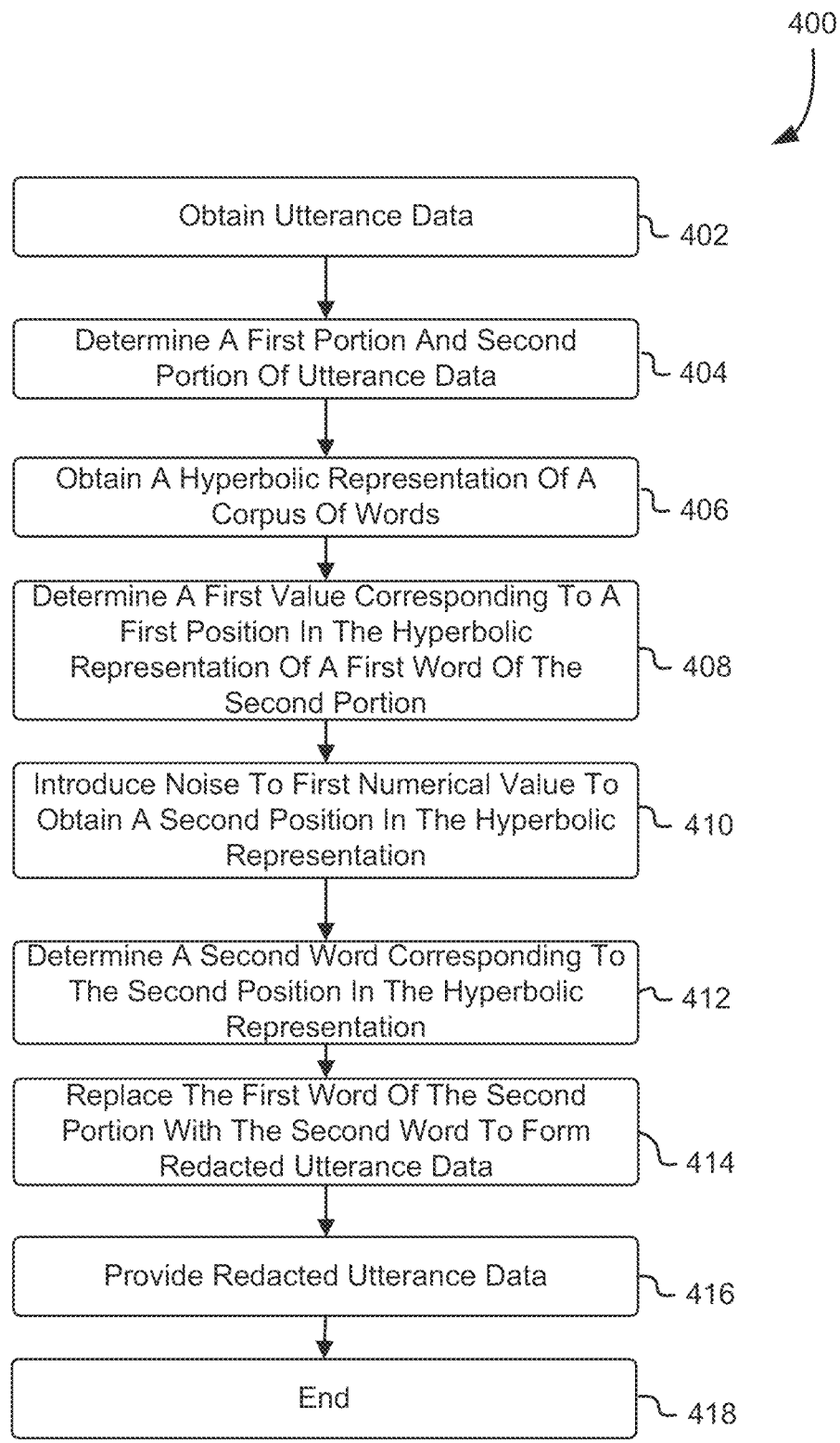
FIG. 4 shows an illustrative process for redacting utterance data using a Hyperbolic representation of a corpus of words.

FIG. 4 describes an illustrative example of a process 400 for applying a differentially private algorithm that utilizes hierarchical word embedding (e.g., in a Hyperbolic word embedding) to an utterance to provide a redacted utterance. For example, process 400 may be used to probabilistically determine a hypernym for a word that is included in the utterance. The process 400 may be performed by any suitable system, such as redaction service or utterance detection device in FIG. 1. Redaction service 400 may obtain 402 utterance data. In some implementations, utterance data may be obtained from an audio signal encoding an utterance. For example, utterance data may be an audio recording of an utterance from a user. In one or more implementations, utterance data may be obtained by an utterance detection device and provided to a redaction service. In some implementations, utterance data may include a transcript that may be derived from an audio signal encoding the utterance. The transcript may be textual version, script, or log corresponding to the utterance. In some implementations, utterance data comprises a command or search query. For example, utterance data may include string $x=w_1 w_2 ... w_l$, privacy parameter $\varepsilon>0$.

A redaction service, such as redaction service 110 depicted in FIG. 1, may determine 404 portions of utterance data that are potentially sensitive or not. In some implementations, a portion that is not sensitive may be identified by searching a differentially private exploration tree of variable length n-grams. In some implementations, the differentially private exploration tree may be created such that every node represents a word and each node may be associated with a query defined by a sequential walk from a root of the tree to that node.

In some implementations, a value of a node may correspond to an amount of times a query occurs. In one or more implementations, a node and leaf of an exploration tree may contain an indication of a noisy count of an original query that terminates at that node or leaf, as discussed previously herein.

In some implementations, an exploration tree may be searched to select a portion of utterance data that is not sensitive. In one or more implementations, one or more strings may be matched against an exploration tree and the string having the longest prefix or highest frequency count may be selected as a portion that is not sensitive. In some implementations, a candidate n-gram may be identified that that includes a substring having a maximum length one less than a length of the utterance. For example, if the utterance is a phrase having 10 words, the maximum length of the substring may be 9 words. In some embodiments, the candidate n-gram associated with a longest prefix and a highest frequency count of the differentially private exploration tree is selected as the portion that does not include sensitive information. In some implementations, the second portion that is not sensitive includes the remaining portion of the utterance that was not included within the first portion.

It will be appreciated that potentially sensitive portions are not limited to personally identifiable information, e.g., social security numbers, birthdates, etc. In some implementations, potentially sensitive portions of an utterance may be identified as "slot" portions that may be easily replaced. Such slot portions may be specified in a database. The remaining words of the utterance may be classified as not sensitive or "carrier phrase." The slot portions may be identified as 'variables' in queries that can take on different values and are identified by an instance type. For example, in a query "play techno on station XYZ" the words "techno" and "station XYZ" may be identified as slot or potentially sensitive portions, and "play" and "on" may be identified as carrier phase or not sensitive information.

Redaction service may obtain 406 a Hyperbolic representation of a text corpus (e.g., corpus of words). In some implementations, the Hyperbolic representation may be a Hyperbolic embedding that indicates a plurality of hierarchical relationship between words. In one or more implementations, the Hyperbolic embedding may model a word hierarchy through norms of the word vectors and word similarity through distance between word vectors. In one or more implementations, a Hyperbolic embedding may model hypernymy relationships (e.g., LONDON→ENGLAND) or multiple latent hierarchies for a given word (e.g., LONDON→LOCATION and LONDON→CITY). For example, Hyperbolic embeddings may capture IS-A relationships (or concept hierarchies) of a large text corpus. It will be appreciated that this disclosure is not limited to Hyperbolic representations. Other types of embedding structures that indicate concept hierarchies between words may be utilized. In some implementations, the Hyperbolic embedding may include a WeblsADb Is-A relationship in the GloVe vocabulary into a Poincaré disk. For example, the Hyperbolic representation may include the word "techno."

Redaction service may determine 408 a first value corresponding to a first position in the Hyperbolic representation of a first word of the second portion. In some implementations, values may be vectors or coordinates. The first position may be identified using a vector value. For example, the vector value indicating a position in the Hyperbolic representation for "techno" may be determined. For example, a step of determining a first value corresponding to a first position in the Hyperbolic representation may be $\phi_i=\phi(w_i)$.

Redaction service may introduce noise 410 to first numerical value to obtain a second position in the Hyperbolic representation. The noise that is introduced to the first value may be sampled from a Hyperbolic distribution, for example, according to process 500. Sampling may be used to obtain values for noise to be introduced because it may be difficult to sample directly from a Hyperbolic representation. In one or more implementations, a step of introducing noise to the first value to obtain a second position may be represented by $\hat{\phi}_i=\phi_i+N$. In an example where "techno" is the first word, the second position in the Hyperbolic representation may correspond to the word "music," which is a hypernym of "techno."

Redaction service may determine 412 a second word corresponding to the second position in the Hyperbolic representation. In some implementations, a plurality of words may be determined. In some implementations, a step of obtaining the second word may be determined in accordance with $\hat{w}_i = \mathrm{argmin}_{u \in w}\|\phi(u)-\hat{\phi}_i\|$. For example, the first word may be "techno" and the second word may be "music."

Redaction service may replace 414 the first word of the second portion with the second word to form redacted utterance data. For example, "techno" may be replaced with "music" to form redacted utterance data. For example, the step of replacing the first word of the second portion with the second word to form the redacted utterance data may accomplished by inserting $\hat{w}_i$ in ith position of $\hat{x}$.

Redaction service may provide 416 redacted utterance data, for example, to a downstream system or by storing. In some implementations, the redacted utterance data may include a redacted transcript. In some implementations, the redacted utterance may be transmitted to or received by a redaction delivery module (e.g., the data service 124 depicted in FIG. 1). In some implementations, the redacted utterance is locally stored on a memory device a data service (e.g., the redaction service 110 depicted in FIG. 1). In some embodiments, the redacted utterance may be provided to one or more downstream systems or processes for additional processing. Advantageously, the redacted utterance data has been scrubbed of personally identifiable information with certain probabilistic privacy guarantees as described previously herein, and may consequently be used by downstream systems and processes that may not satisfy stringent data protection regulations.

An implementation of process 400 may be performed with the following example algorithm:

Algorithm 1 - Privacy Mechanism Algorithm

Figure 5:
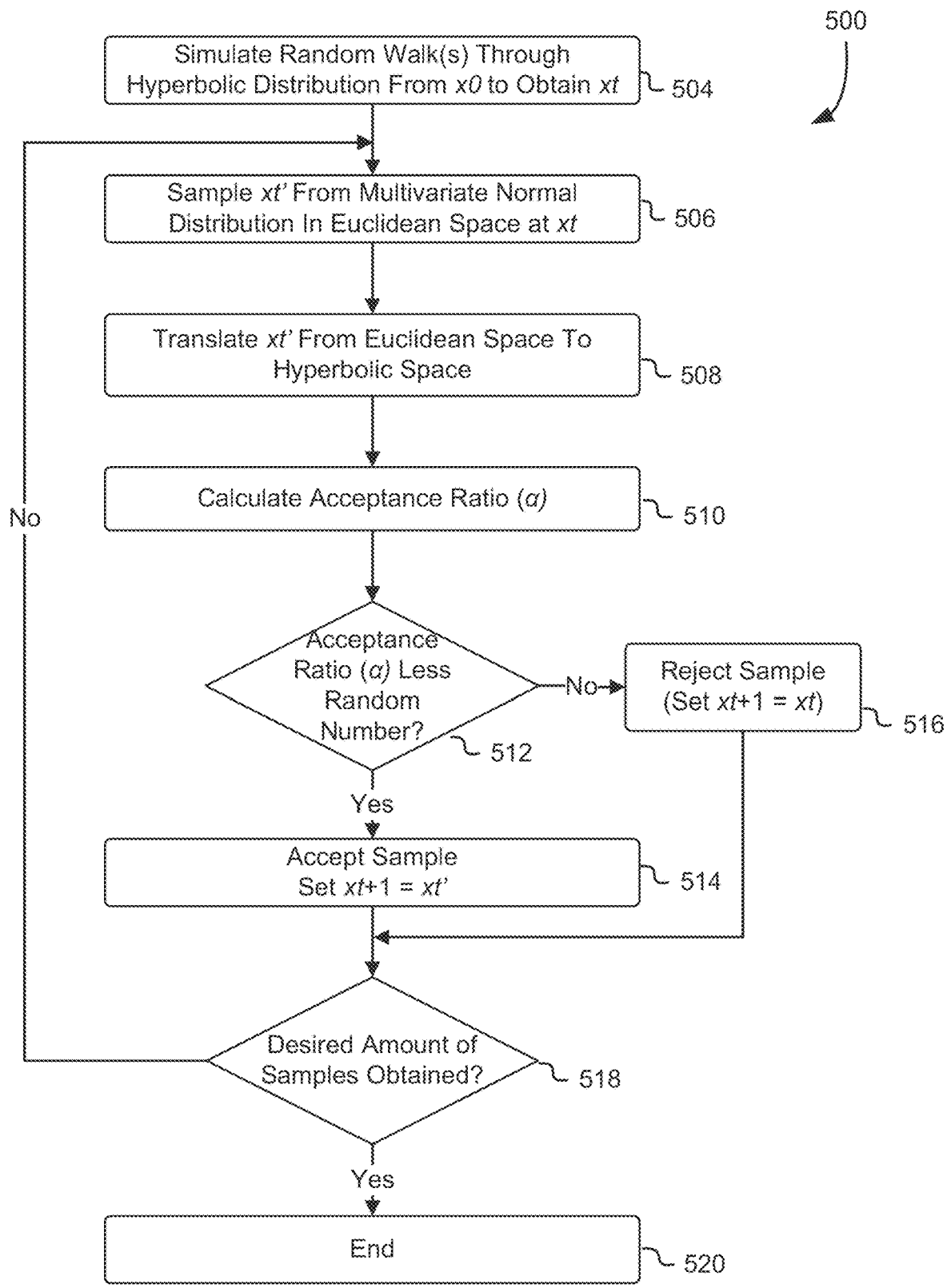
FIG. 5 shows an illustrative process for sampling points from a Hyperbolic distribution.

Input: string $x = w_1 w_2 \ldots w_l$, privacy parameter $\varepsilon > 0$
1  for $i \in \{1, \ldots, l\}$ do
2  | Word embedding $\phi_i = \phi(w_i)$
3  | Sample noise N with density $p_N(\vec{z}) \propto \exp(-\varepsilon\|\vec{z}\|)$
4  | Perturb embedding with noise $\hat{\phi}_i = \phi_i + N$
5  | Discretization $\hat{w}_i = \mathrm{argmin}_{u \in w}\|\phi(u) - \hat{\phi}_i\|$
6  | Insert $\hat{w}_i$ in ith position of $\hat{x}$
7  release $\hat{x}$ FIG. 5 describes an illustrative example of a process 500 for sampling noise from a Hyperbolic distribution, which may be utilized, for example, in connection with a process of redacting utterance data (e.g., process 400 of FIG. 4). The noise may be a hyperbolic Laplace noise. In one or more implementations, process 500 may be a sub process of process 400 depicted in FIG. 4. Steps of process 500 may be performed by any suitable system, such as redaction service 110 in FIG. 1. Redaction service may begin 504 simulating random walks through a Hyperbolic distribution from $x_0$ to obtain $x_t$ to derive sampled points from the Hyperbolic distribution. In some implementations, sampled points are derived by simulating random walks using a Metropolis-Hastings (MH) algorithm. In some implementations, point $x_0$ is the first sample. In some implementations, point $x_0$ may be set at the origin of a Poincaré model. In some implementations, the sample $x_0$ may be set as the current point $x_t$. In one or more implementations, a probability distribution for a Hyperbolic distribution may be f (x, ε), which may be defined in the following equation, where ε is the $d_x$-privacy parameter:

$$p(x \mid \mu = 0, \varepsilon) = \frac{1+\varepsilon}{2 \, {}_2F_1(1, \varepsilon, 2+\varepsilon, -1)} \left(\frac{2}{\|x\|-1} - 1\right)^{-\varepsilon}.$$

A redaction service may derive sampled points in order to obtain an amount of noise to add to a value (e.g., a vector) corresponding to the word to be redacted. Sampling cannot typically be accomplished directly from a high dimension Hyperbolic distribution, so sampled points are derived.

Redaction service may sample 506 $x_t'$ from multivariate normal distribution in Euclidean space at $x_t$. In some implementations, to select the next candidate $x_t'$, the MH algorithm involves the point being sampled from a symmetric distribution g such that $g(x_t | x_t')=g(x_t'|x_t)$ for example, a Gaussian distribution centered at $x_t$. In some implementations, $x_t'$ may be sampled from the multivariate normal distribution in Euclidean space, centered at $x_t$.

Redaction service may translate 508 $x_t'$ from Euclidean space to Hyperbolic Space. In some implementations, the sampled point $x_t$ may be translated to the $\mathcal{H}^n$ Lorentz model in $\mathbb{R}^{n+1}$ dimensional Minkowski space, for example, by setting the first coordinate using the following equation:

$$x_0 \in \mathcal{H}^n = \sqrt{1 + \|x'\|^2}$$

where $x'=(x_1, \ldots, x_n)$. The Lorentz coordinates may then be converted to the $\mathcal{B}_n$ Poincaré model in $\mathbb{R}^n$ Hyperbolic space using the equation $$x\rho = \frac{x'}{1 + x_0}$$

where $x'=(x_1, \ldots, x_n)$. Thus, in some implementations the coordinates of the sampled point $x_t$ may be in the Poincaré model.

Redaction service may calculate 510 an acceptance ratio. In some implementations, for individual MH iterations, an acceptance ratio α may be calculated by α=f($x_t'$, ε)/f($x_t$, ε), with privacy parameter ε.

Redaction service may evaluate whether α is less than a uniform random number u~$\mathcal{U}$ ([0, 1]) at 512. If α is less than a uniform random number u~$\mathcal{U}$ ([0, 1]), the sampled point may be accepted 514. In some implementations, the sampled point may be accepted by setting $x_{t+1}=x_t'$ (and sample the next point centered at this new point). If α is not less than a uniform random number u~$\mathcal{U}$ ([0, 1]), the sampled point may be rejected 516. In some implementations, the sampled point may be rejected by setting $x_{t+1}$ to the old point $x_t$.

Redaction service may evaluate whether a desired amount of samples have been obtained at 518. If the desired amount of samples have not been obtained, the process 500 may continue to 506 to obtain an additional sample. If the desired amount of samples has been obtained, then the process continues to 520 where the process 500 may end. In some implementations, the process ending involves the samples being returned.

Sampling in Hyperbolic spaces comes with numeric stability issues as the curvature and dimensionality of the space increases. This may lead to points being consistently sampled at an infinite distance from the mean. As a result, an updated vector may be constrained to remain within the Poincaré ball by updating the noisy vectors as:

$$x_0 \in H^n = \sqrt{1 + \|x'\|^2}$$

where λ is a small constant. This occurs as a post-processing step and therefore does not affect the $d_x$-privacy proof. In some implementations, the value may be set to λ=10e−5.

An implementation of process 500 may be represented with the following example algorithm:

Algorithm 2 - An Hyperbolic Noise Sampling Mechanism
Input: dimension n > 0, μ = 0, privacy parameter ε > 0
Result: k results from $B^n$

```
1   Let f (x, ε) be the Hyperbolic noise distribution in n dimensions
2   set x_0 = [1, 0, . . . 0]
3   set x_t = x_0
4   set b as the initial sample burn-in period
5   while i < k + b do
6   |   sample x' ~ N(x_t, Σ)
7   |   translate x' → H^n → B^n
8   |   compute α = f(x')/f(x_t)
9   |   sample u ~ U [(0, 1)]
10  |   if u ≥ ∝ then
11  |   |   accept sample
12  |   |   set x_{t+1} = x'
13  |   else
14  |   |   reject sample
15  |   |   set x_{t+1} = x_t
16  release x_i^n, . . . , x_k^n
```

In some implementations, the noise samples obtained from Algorithm 2 may be used as the noise that is added in Algorithm 1.

In some implementations, the value of ε may be calibrated for a given mechanism M. As used herein, M(w)=w means the privacy mechanism M returns the same word, while M(w)=ŵ represents a different random word from the algorithm. The privacy guarantees that result in uncertainty for the adversary over the outputs of M(w), and indistinguishability over the inputs to M(w).

The uncertainty of an adversary is defined over the probability of predicting the value of the random variable ŵ i.e. Pr[M(w)=ŵ]. This follows from the definition of Shannon entropy which is the number of additional bits required by the adversary to reveal the user's identity or some secret property. Even though entropy is a measure of uncertainty, there are issues with directly adopting it as a privacy metric since it is possible to construct different probability distributions with the same level of entropy.

Uncertainty statistics may be defined using the two extremes of the Rényi entropy. The Hartley entropy $H_0$ may be a special case of Rényi entropy with α=∞. $H_0$ may depend on vocabulary size $|\mathcal{W}|$ and is therefore indicative of a best-case scenario as it represents the perfect privacy scenario for a user as the number of words grow. Hartley entropy may be given by $H_0 = \log_2 |\mathcal{W}|$. Min-entropy $H_\infty$ is the special case with α=∞ which may be a worst-case scenario because it depends on the adversary attaching the highest probability to a specific word p(w). Min-entropy may be given by $$H_\infty = -\log_2 \max_{w \in \mathcal{W}}(p(w)).$$

Mechanism M(w) at ε=(0, ∞) may have full support over the entire vocabulary $\mathcal{W}$. However, the effective number of new words returned by the mechanism M(w) over multiple runs may approach a finite subset. As a result, we can expect that $|\hat{\mathcal{W}}|_{\varepsilon \to 0} > |\hat{\mathcal{W}}|_{\varepsilon \to \infty}$ for a finite number of successive runs of the mechanism M(w). $S_W$ refers to the effective number $\|\hat{\mathcal{W}}|$ at each value of ε for each word. Our estimate of the Hartley entropy is $H_0 = \log_2 |\mathcal{W}| \approx \log_2 S_w$.

Similarly, we expect that over multiple runs of the mechanism M(w), as ε→∞, the probability Pr[M(w)=w] increases and approaches 1. As a result, we can expect that $Pr[M(w)=w]_{\varepsilon \to 0} < Pr[M(w)=w]_{\varepsilon \to \infty}$ for a finite number of successive runs of the mechanismM(w). We define this number Pr[M(w)=w] at each value of ε, and for each word as $N_w$. Therefore, our estimate of the Min-entropy $H_\infty$, becomes $$H_\infty = -\log_2 \max_{w \in \mathcal{W}}(p(w)) \approx -\log_2 N_w.$$

Figure 6:
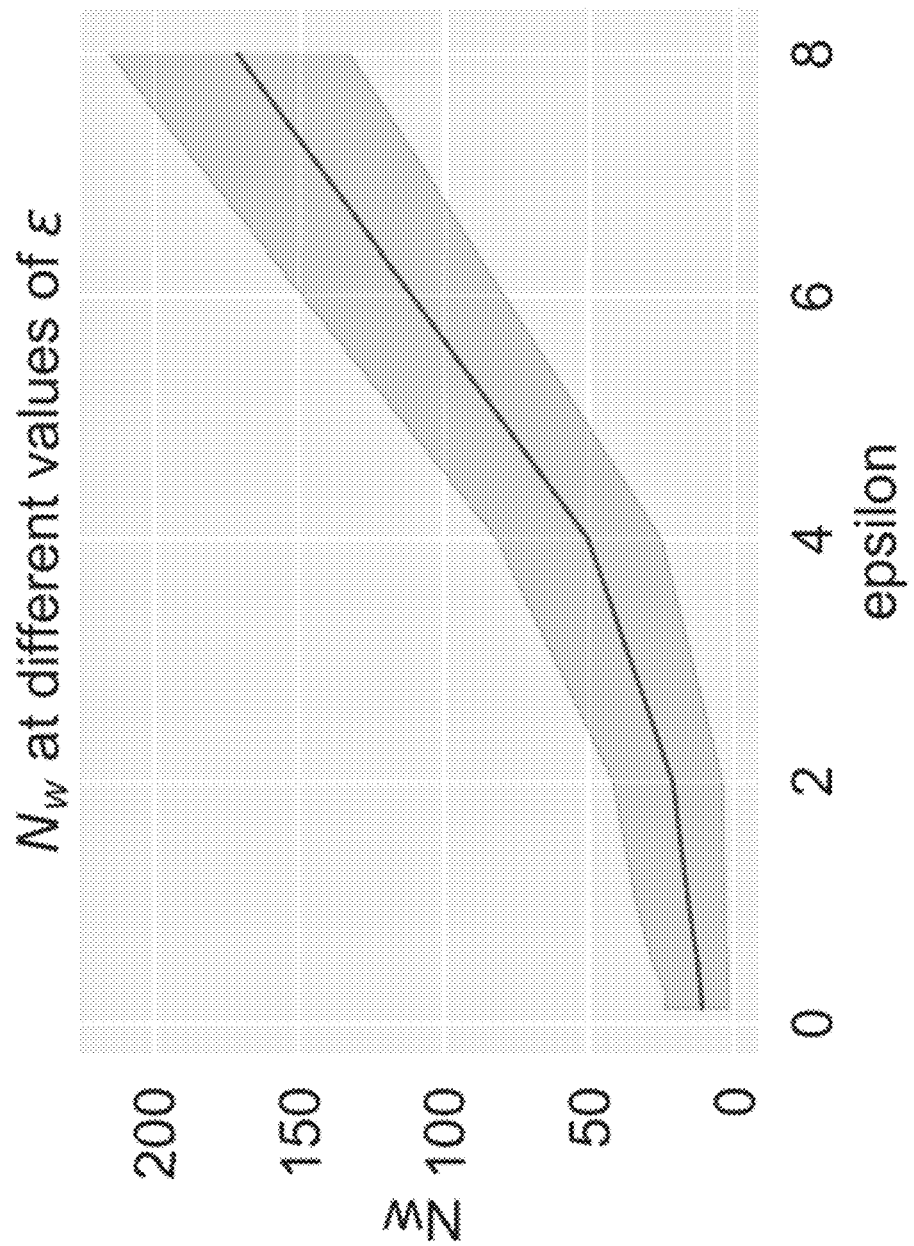
FIG. 6 shows a plot estimating quantities of $N_w$ for a random population of the vocabulary $\mathcal{W}$ at different values of $\varepsilon$.
Figure 7:
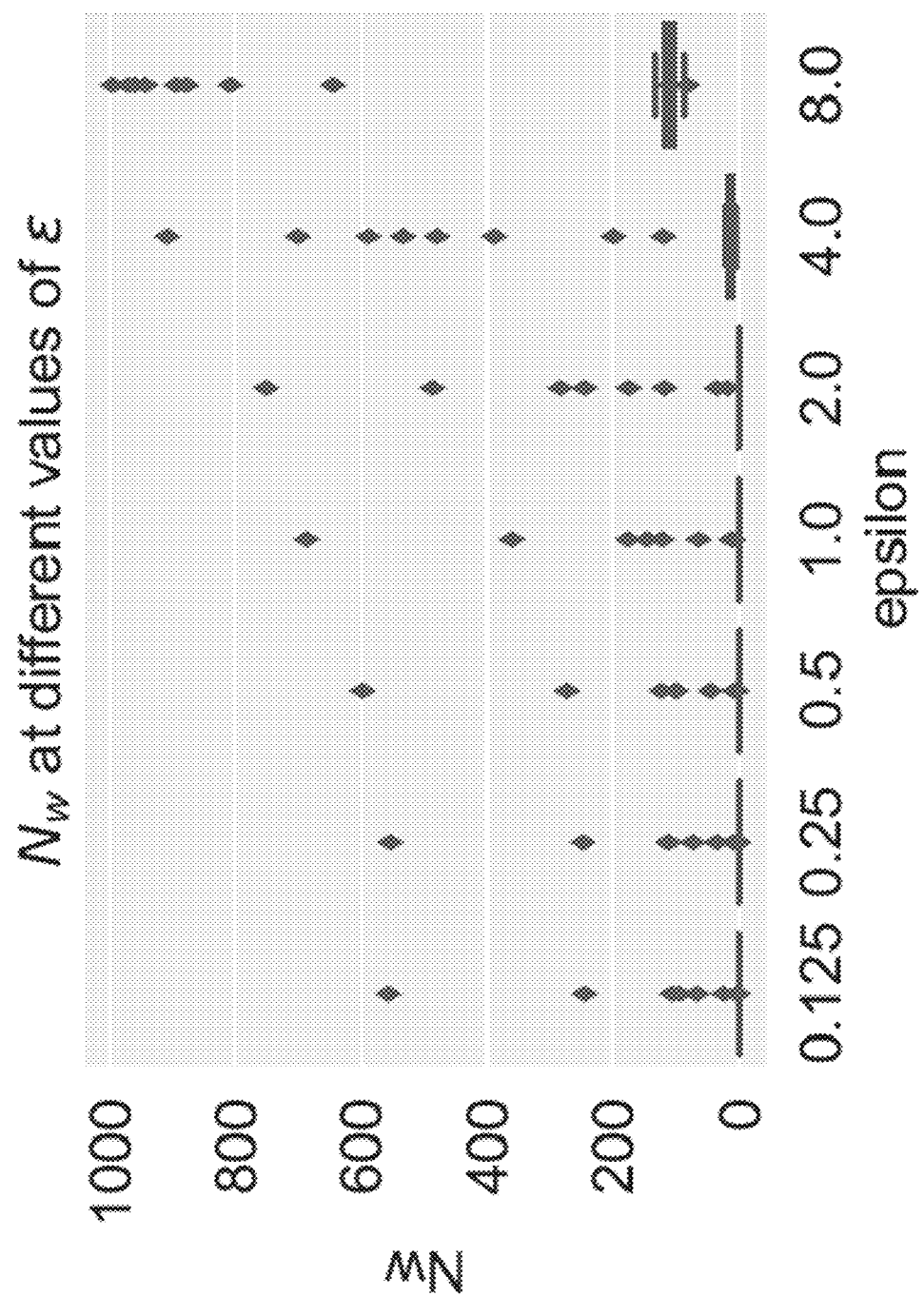
FIG. 7 shows a plot estimating quantities of $N_w$ for a random population of the vocabulary $\mathcal{W}$ at different values of $\varepsilon$ that illustrates a worst-case guarantee.
Figure 8:
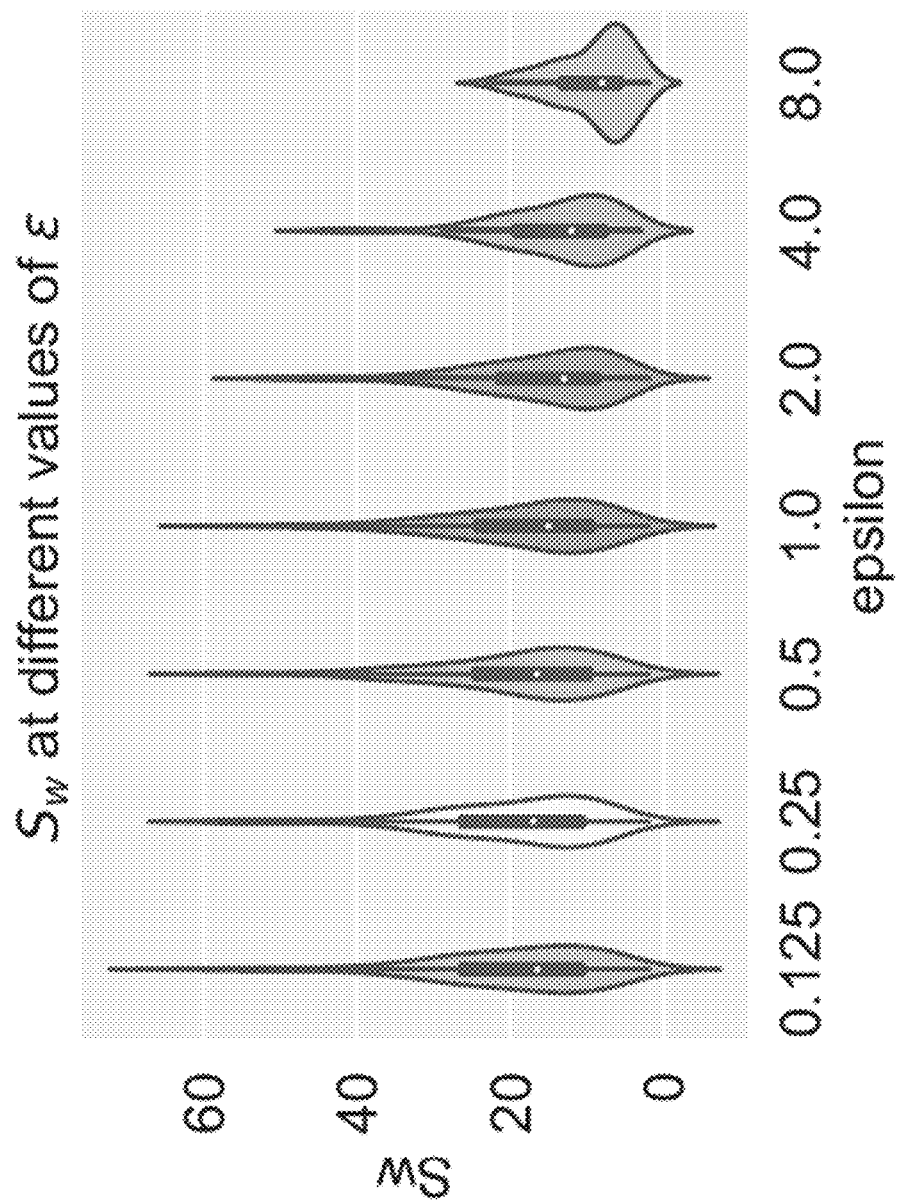
FIG. 8 shows a plot estimating quantities of $S_w$ obtained by plotting mechanism M(w) for a random population of the vocabulary $\mathcal{W}$ at different values of E.

FIGS. 6 and 7 are plots estimating the quantities of $N_w$ obtained by plotting mechanism M(w) for a random population of the vocabulary $\mathcal{W}$ at different values of E. More specifically, FIG. 6 is a plot of $N_w$ statistics: avg count of M(w)=w. FIG. 7 is a plot of a worst-case guarantees as shown by the upper bound of the $N_w$ statistic provides a way to fix an equivalent 'radius of high protection'. The 'radius' corresponds to the upper bound on the probability Pr[M(w)=w] which sets the guarantee on the likelihood of changing any word in the embedding vocabulary. Consequently, the words which are provided with the 'same distinguishability level' can be interpreted by the size of the results in FIGS. 8 and 9. FIG. 8 is a plot estimating the quantities of $S_w$ obtained by plotting mechanism M(w) for a random population of the vocabulary $\mathcal{W}$ at different values of E.

Figure 9:
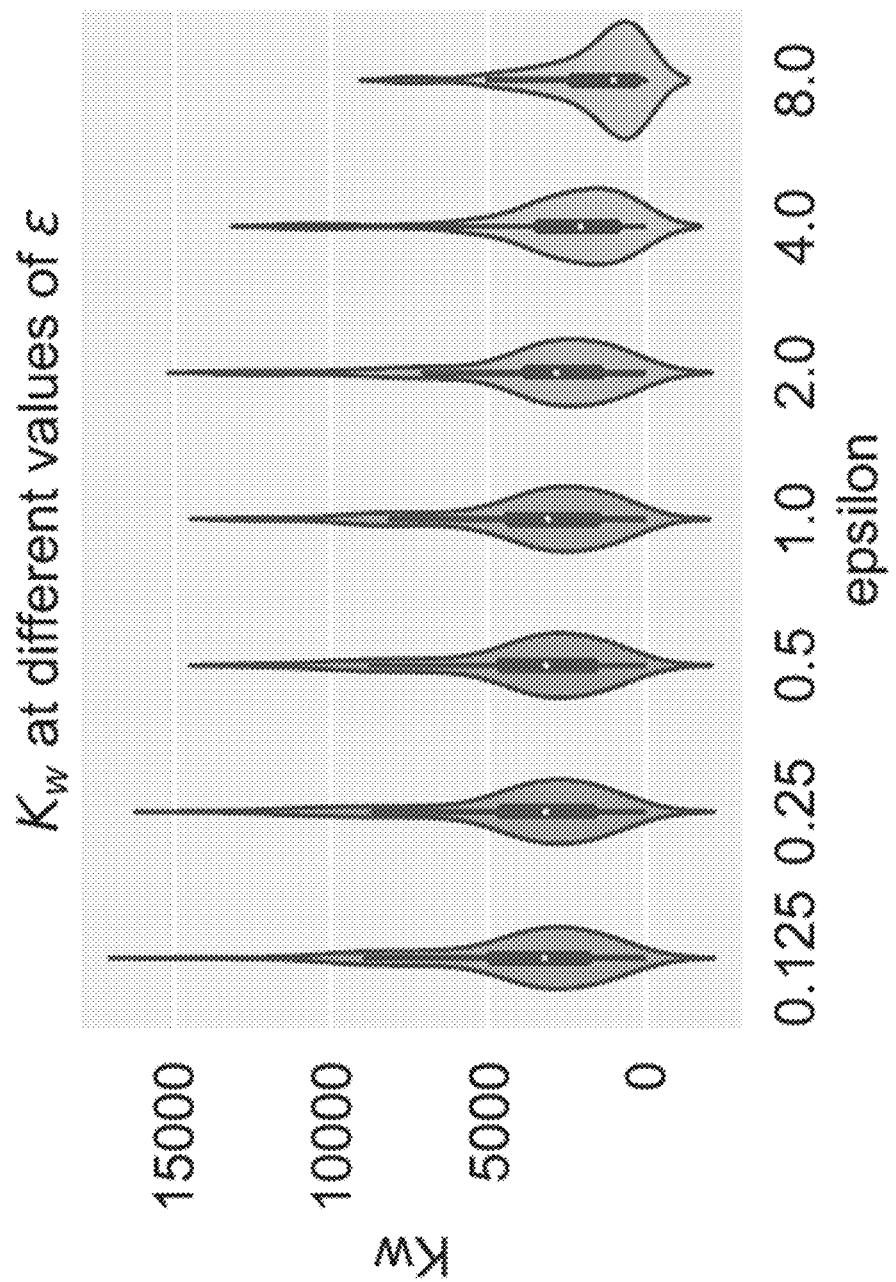
FIG. 9 shows a plot is a plot estimating quantities of $K_W$ obtained by plotting mechanism M(w) for a random population of the vocabulary $\mathcal{W}$ at different values of $\varepsilon$.

FIG. 9 is a plot is a plot estimating the quantities of $K_w$ obtained by plotting mechanism M(w) for a random population of the vocabulary $\mathcal{W}$ at different values of ε. Indistinguishability metrics of privacy indicate denote the ability of the adversary to distinguish between two items of interest. $d_x$-privacy provides degrees of indistinguishability of outputs bounded by the privacy loss parameter E. For example, given a query x='send the package to London', corresponding outputs of x̂='send the package to England' or '. . . to Britain' provide privacy by output indistinguishability for the user. This is captured as uncertainty over the number of random new words as expressed in the $S_w$ metric. Our privacy guarantees also may extend to indistinguishability over the inputs. For example, for an adversary observing the output x̂='send the package to England', they are unable to infer the input x that created the output x̂ because, for the permuted word ŵ=England, the original word w could have been any member of the set {w: ∀w∈$\hat{\mathcal{W}}$ if w ≺ ŵ}, where a ≺ b implies that a is lower than b in the embedding hierarchy. For example, {LONDON, MANCHESTER, BIRMINGHAM, . . . } ≺ {ENGLAND, BRITAIN, . . . }. Since this new statistic derives from $S_w$, we expect it to vary across ε in the same manner. Hence, we replace $\hat{\mathcal{W}}$ with $S_w$ and define the new statistic $K_w$ as: $K_w = \min|\{w:\forall w \in S_w, \text{ if } \hat{w} \prec w\}|$ $K_w$ can be thought of formally in terms of plausible deniability. Plausible deniability involves whether an adversary can or cannot deduce that a particular input was significantly more responsible for an observed output. This means, there exists a set of inputs that could have generated the given output with about the same probability. For a vocabulary size |W|>k and mechanism M such that ŵ=M($w_1$), we get k-indistinguishability over the inputs with probability γ if there are at least k−1 distinct words $w_2, \ldots, w_k \in \mathcal{W} \setminus \{d_1\}$ such that:

$$\gamma^{-1} \le \frac{Pr[M(w_i)] = \hat{w}}{Pr[M(w_j)] = \hat{w}} \le \gamma$$

for any i, j∈{1, 2, . . . , k}

Figure 10:
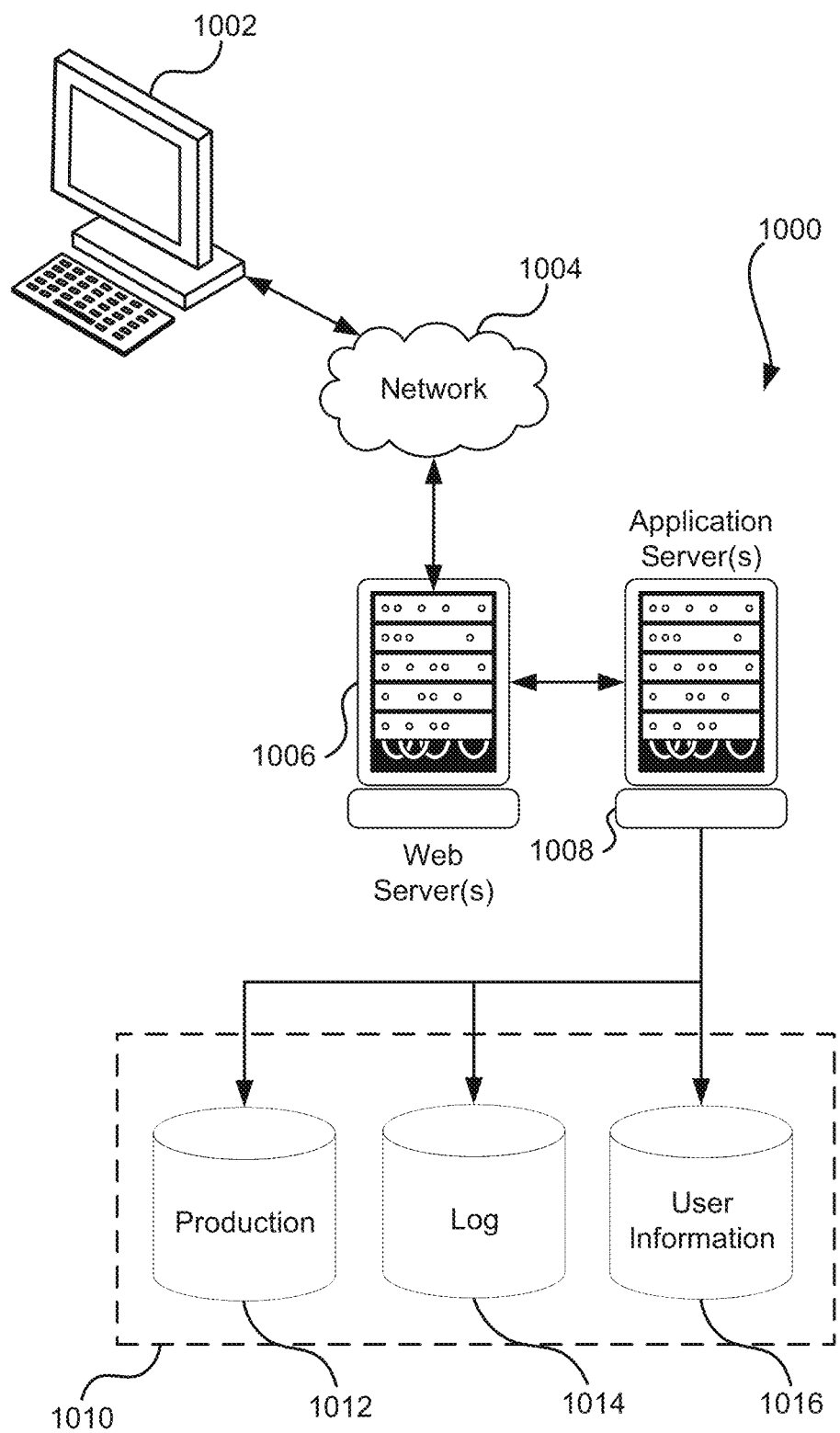
FIG. 10 shows a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/ or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation ("JSON"), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 602 and the application server 608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
obtaining a transcript derived from an audio signal encoding an utterance, the utterance corresponding to a query;
determining a first portion of the transcript and a second portion of the transcript, wherein the second portion has been classified as including potentially sensitive information;
determining, based at least in part on a second word in the second portion of the transcript, a first value in a Hyperbolic representation of a corpus of words, the first value corresponding to a first position in the Hyperbolic representation;
as a result of adding a noise value to the Hyperbolic representation at the first position, obtaining a second position in the Hyperbolic representation;
determining a first word corresponding to the second position in the Hyperbolic representation;
replacing the second portion with the first word to form a redacted transcript; and
providing the redacted transcript to cause the query to be executed.

2. The computer-implemented method of claim 1, wherein determining the first portion of the transcript is based at least in part on:
determining a candidate n-gram comprising a substring having a maximum length of one less than a length of the transcript;
determining that the candidate n-gram is associated with a longest prefix and a highest frequency count of the differentially private exploration tree; and
selecting the candidate n-gram as the first portion of the transcript.

3. The computer-implemented method of claim 1, wherein the second portion includes a second word, and further comprising:
determining a word embedding of the Hyperbolic representation for the second word, wherein the noise value is added to the word embedding of the Hyperbolic representation to generate a perturbed word embedding; and
determining the first word from the perturbed embedding.

4. The computer-implemented method of claim 1, wherein the Hyperbolic representation of the corpus of words indicates a plurality of hierarchical relationships between individual words in the corpus of words.

5. A system, comprising:
one or more processors; and
memory that stores computer-executable instructions that are executable by the one or more processors to cause the system to:
determine a first portion of utterance data and a second portion of the utterance data, wherein the second portion is classified as including potentially sensitive information;
obtain a hierarchical representation of a corpus of words;
add noise to the hierarchical representation at a position corresponding to at least the second portion to obtain a different position of the hierarchical representation, the different position of the hierarchical representation corresponding to a word, wherein the noise is determined at least in part by simulating a plurality of random walks through a hyperbolic distribution of the hierarchical representation;
replace the second portion with the word to form redacted utterance data; and
provide the redacted utterance data to be processed.

6. The system of claim 5, wherein the hierarchical representation includes a Hyperbolic embedding of the corpus of words and indicates a plurality of hierarchical relationships between individual words of the corpus of words.

7. The system of claim 6, wherein the noise is determined at least in part by:
obtaining a first value corresponding to the position in the Hyperbolic embedding;
translating the first value to Euclidian space to obtain a second value; and
translating the second value in Euclidean space to a third value in Hyperbolic space.

8. The system of claim 7, wherein the word is determined based at least in part on the third value in Hyperbolic space.

9. The system of claim 5, wherein the added noise includes a Hyperbolic Laplace noise.

10. The system of claim 5, wherein:
the first portion is based at least in part on a differentially private exploration tree.

11. The system of claim 5, wherein the utterance data is at least one of a command or a search query.

12. A non-transitory computer-readable storage medium storing thereon executable instructions that, as a result of being executed by one or more processors of a computer system, cause the computer system to at least:
determine a portion of stored utterance data;
probabilistically determine a first word that is a hypernym of a second word of the portion, wherein the first word is probabilistically determined as a result of applying a noise value to a Hyperbolic word embedding at a first value, the first value corresponding to the second word;
determine a redacted utterance at least in part by replacing the second word of the portion of the utterance data with the first word; and
store the redacted utterance.

13. The non-transitory computer-readable storage medium of claim 12, wherein
the noise value that is added to the Hyperbolic word embedding is determined based at least on a Hyperbolic noise distribution and the first value.

14. The non-transitory computer-readable storage medium of claim 13, wherein the noise value that is applied is determined based at least in part by sampling a probability distribution of the Hyperbolic word embedding that includes the first word and the second word.

15. The non-transitory computer-readable storage medium of claim 14, wherein sampling the probability distribution includes at least simulating a plurality of random walks through the probability distribution.

16. The non-transitory computer-readable storage medium of claim 14, wherein the Hyperbolic word embedding is a Poincaré model.

17. The non-transitory computer-readable storage medium of claim 12, wherein: the first word is determined at least in part by:
determining a second value in a Euclidean word embedding that is based at least in part on the first value; and
determining a third value in Hyperbolic space based at least in part on the second value in the Euclidean word embedding.

18. The non-transitory computer-readable storage medium of claim 17, wherein the third value includes coordinates in a Poincaré model.

19. The non-transitory computer-readable storage medium of claim 17, wherein the second value is translated into a Lorentz model.

\* \* \* \* \*